United States Patent
Colonna et al.

(10) Patent No.: US 7,991,826 B1
(45) Date of Patent: Aug. 2, 2011

(54) DIGITAL RELAY HAVING AN IMPROVED MAN-MACHINE INTERFACE

(75) Inventors: Donato Colonna, Milan (IT); Fabio Gatelli, Bagnolo-Mella (IT)

(73) Assignee: ABB Technology AG, Zurich (CH)

( * ) Notice: Subject to any disclaimer, the term of this patent is extended or adjusted under 35 U.S.C. 154(b) by 747 days.

(21) Appl. No.: 10/169,401

(22) PCT Filed: Oct. 27, 2000

(86) PCT No.: PCT/EP00/10703
§ 371 (c)(1),
(2), (4) Date: Dec. 12, 2002

(87) PCT Pub. No.: WO01/50564
PCT Pub. Date: Jul. 12, 2001

(51) Int. Cl.
*G06F 15/16* (2006.01)
(52) U.S. Cl. ........ 709/203; 709/218; 709/223; 713/300; 700/295
(58) Field of Classification Search .................. 709/218, 709/223; 713/300; 700/295
See application file for complete search history.

(56) References Cited

U.S. PATENT DOCUMENTS

| | | | | |
|---|---|---|---|---|
| 5,754,738 | A * | 5/1998 | Saucedo et al. | 706/11 |
| 6,185,198 | B1 * | 2/2001 | LaDue | 370/329 |
| 6,226,642 | B1 * | 5/2001 | Beranek et al. | 707/10 |
| 6,266,160 | B1 * | 7/2001 | Saito et al. | 358/407 |
| 6,425,093 | B1 * | 7/2002 | Singh et al. | 714/38 |
| 6,618,368 | B1 * | 9/2003 | Tanigawa et al. | 370/352 |
| 6,732,191 | B1 * | 5/2004 | Baker et al. | 710/1 |
| 6,757,868 | B1 * | 6/2004 | Glaser et al. | 715/207 |
| 6,792,337 | B2 * | 9/2004 | Blackett et al. | 700/295 |
| 6,944,555 | B2 * | 9/2005 | Blackett et al. | 702/62 |
| 7,099,934 | B1 * | 8/2006 | Ewing et al. | 709/223 |
| 2003/0204756 | A1 * | 10/2003 | Ransom et al. | 713/300 |
| 2009/0326684 | A1 * | 12/2009 | Wang et al. | 700/83 |

FOREIGN PATENT DOCUMENTS

| | | |
|---|---|---|
| DE | 19722898 A1 | 12/1998 |
| EP | 0814393 A1 | 12/1997 |
| JP | 11191927 | 7/1999 |

* cited by examiner

*Primary Examiner* — Thuong T Nguyen
(74) *Attorney, Agent, or Firm* — Connolly Bove Lodge & Hutz LLP

(57) ABSTRACT

A digital relay, for regulating the operation of a power distribution apparatus, comprising a computerized interface, which includes at least a computerized module providing HTTP (Hyper Text Transfer Protocol) services.

18 Claims, 2 Drawing Sheets

DIGITAL RELAY HAVING AN IMPROVED MAN-MACHINE INTERFACE

CROSS REFERENCE TO RELATED APPLICATIONS

The instant application is a 371 national stage entry of PCT/EP00/10703 filed Oct. 27, 2000, which claims priority to EP 99204596.3 filed Dec. 30, 1999.

The present invention relates to a digital relay for controlling the operation of power distribution apparatuses (such as for example switchgears, circuit breakers, disconnectors, contactors, and the like), which has an improved man-machine interface.

More particularly, the present invention relates to a digital relay, which has an improved man-machine interface based on a World Wide Web server (commonly called Web server), implementing an HTTP (Hyper Text Transfer Protocol) protocol.

Digital relays are well known in the state of the art. Their use is particularly extended in medium and low voltage power distribution networks (i.e. for a voltage range lower than 100 KV).

The main function of a digital relay is the digital generation of signals for controlling the operation of a power distribution apparatus. For achieving this aim, a control unit processes, based on predefined processing strategies, some input information that may be provided, for example, by predefined sensors, which can regard network fault events or other conditions for operating the controlled power distribution apparatus. The main way in which a user can provide the control unit with all this useful information, regarding these processing strategies, is the programming of the man-machine interface (commonly called user-interface or MMI) of the digital relay. This programming activity is generally performed using predefined hardware buttons that allow using predefined software menus. The MMI also allows the display of information regarding the status of the digital relay and, more in general, of the power distribution system during the operation.

Traditional digital relays are characterised by some drawbacks. Some of the main drawbacks are due to the basic structure of the MMI. The MMIs of traditional relays are generally hardware/software modules that are highly dependent on the digital relay they are associated with. In practice, the MMIs of traditional digital relays are hardware/software custom modules, whose functionality is generally given both by their predefined hardware buttons, used for programming the control strategies adopted by the control unit, and by their predefined firmware, stored in non-volatile memories. This fact, even if it represents an apparent cost saving in the realisation of a single kind of digital relay, has important consequences. First, once a MMI is installed on a digital relay, its functionalities are definitely fixed by the hardware module, which has been adopted. Even few changes to the MMI functionalities imply a considerable effort, because an hardware re-design is needed. So a remarkable amount of design activity is needed with subsequent increment of design costs. Moreover, this lack of flexibility can lead also to an increment of the operation costs of a digital relay. In fact, due to the fact that an MMI cannot be changed easily according to the user needs, it is difficult to update its functionalities. So, it is considerably reduced the possibility of satisfying the customer's needs and, on the other side, of improving, at low cost, the performances of the digital relay. Moreover, the lack of standardisation, due to the realisation of custom products, leads unequivocally to an increment of the production costs and to the maintenance costs.

Furthermore, in traditional digital relays, the MMI is generally connected point-to-point to the respective control unit. This fact implies a reduced possibility, unless dedicated developments, to implement extended functionalities, such as the coordination, among various digital relays, of the adopted processing strategies.

Therefore, the main aim of the present invention is to overcome the drawbacks above described providing a digital relay, for regulating the operation of a power distribution apparatus, which comprises a standardised man-machine interface (MMI), whose functionalities can be easily defined/changed, according to the needs.

Within this aim, another object of the present invention is to provide a digital relay, which allows defining/changing the functionalities of user-interface module, without any need of hardware re-design.

Another object of the present invention is to provide a digital relay, which allows defining/changing the MMI functionalities, according to the customer needs and with a remarkable level of flexibility, in a reduced time.

Not the least object of the present invention is to realise a digital relay, which is easy to implement, at a relatively low cost.

Thus, the present invention provides a digital relay, for regulating the operation of a power distribution apparatus, comprising a control unit for generating, based on predefined processing strategies, signals for controlling the operation of the mentioned power distribution apparatus. The digital relay, according to the present invention, further comprises a computerised interface for exchanging information with said control unit. The digital relay, according to the present invention, is characterised by the fact that the mentioned computerised interface comprises at least a computerised module, which provides HTTP (Hyper Text Transfer Protocol) services.

The digital relay, according to the present invention, allows achieving all the intended aims.

The computerised module, which is implemented in the computerised interface of the digital relay, according to the present invention, is, as described in details hereinafter, fully standardised and the definition/change of the MMI functionalities does not require any kind of hardware re-design. Moreover, the implementation of HTTP services, aboard of the computerised module, allows building up a virtual man-machine interface, which is remotely configurable. Moreover, a remarkable improvement of the MMI functionalities can be achieved.

BRIEF DESCRIPTION OF THE DRAWINGS

Further characteristics and advantages of the invention shall emerge more clearly from the description of preferred but not exclusive embodiments of the digital relay, according to the present invention, that are illustrated purely by way of example and without limitation in the attached drawings, wherein.

DETAILED DESCRIPTION

Figure 1:
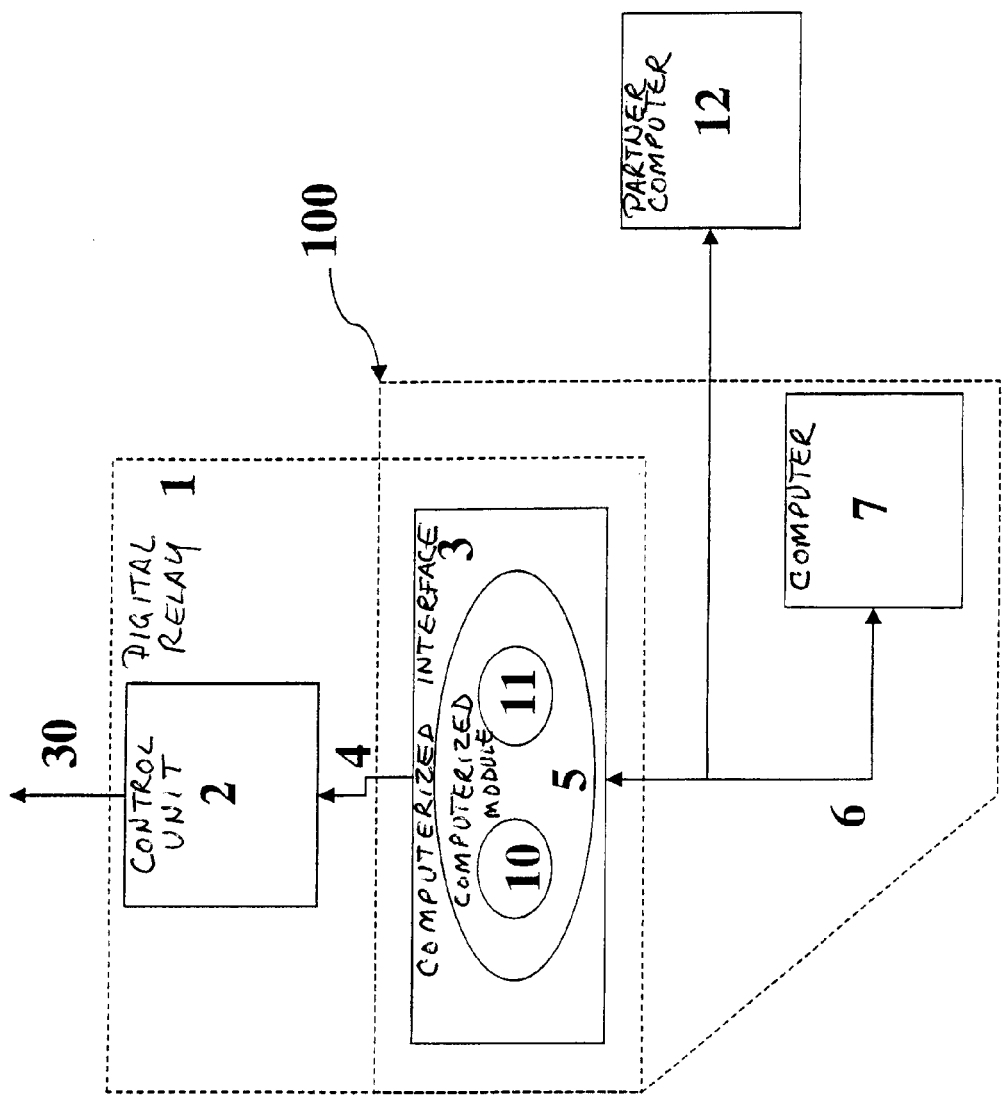
FIG. 1 represents a preferred embodiment of the digital relay, according to the present invention.

The present invention mainly adopts the capabilities provided by the Internet communication technologies. With this term, it is to be intended a set of technologies, which have had an enormous success in the last years. As it is known, these technologies allow powering tremendously the communication among computerised systems. Internet communicating technologies are mainly based on a client-server model of information exchange. This kind of architecture comprises a server (commonly called "the host") that services the needs of a certain number (also very large) of computers (commonly called "the clients") that are connected to it, by means of a communication network. The structure of the communication network can be very simple or extremely complicated and huge, as in the case of the Internet, which is commonly considered as "network of networks". Also the term communication network has to be intended with an extended meaning not necessarily involving hardware communication means but, for example, using also infrared or optical transmission of information.

In order to ensure a proper exchange of information between the host and the intended client, consistent communication protocols are used. A commonly accepted set of protocols, for this purpose, is the Internet Protocol (or "IP"), which dictates routing information, and the Transmission Control Protocol (or "TCP"), according to which information is broken into proper packages for transmission or collected and re-assembled in reception.

It is known that the Internet provides a large number of information-transfer resources. One of these, called the World Wide Web, is commonly used. According to this protocol, the accessible information is identified by a Uniform Resource Locator (called "URL"), which specifies the location of a file in terms of a specific computer (generally called "Web server") and a location on that computer. So, any Internet connected node, which is a computer provided with, TCP/IP resource, can access the file by invoking the proper communication protocol and specifying the URL. A typical communication protocol, which is commonly used in these cases, is the so called "HTTP (Hyper Text Transfer Protocol) protocol". For this reason, Web servers are commonly called "HTTP servers" or "servers providing HTTP services".

The HTTP protocol allows accomplishing effectively to important tasks such as, for example, a quick connection among many documents. In fact, by means of the so called "hypertext links", it is possible for the user to retrieve documents, located in the same or different Web servers.

Hypertext functionalities are generally implemented by the client machine using a computer program called "Web Browser", which allows the user to identify a Web page (one or more files on a Web server) and exchange (download/upload) and display data to/from the Web page. As it is known, most of the Web pages are written in the Hypertext Markup Language (or HTML), which breaks the Web page into syntactic portions that specify layout and contents. An HTML file can contain, for example, text, graphics, buttons that are identified by a "tag". So, when a Web browser is connected to a server providing HTTP services (Web or HTTP server), an HTML file is download from the server to the browser.

HTML languages can provide only static Web pages. Recent innovations have allowed Web pages designers to overcome the static appearance dictated by HTML, thanks to the introduction of "Java" programming languages, which facilitates a dynamic display of information. "Java applets" are stand-alone programs that can be embedded within a Web page and can interact with the user locally thanks to "Java capable" browsers, i.e. browsers provided with a Java language interpreter. Similar functionalities are provided by the so called "Active X" controls that are programs, which cab be written in many different computer languages (included Java), that can operate only in conjunction with Web browsers running in client machines with appropriate architecture. Referring now to FIG. 1, the digital relay, according to the present invention, (reference 1) comprises a control unit 2 for generating, based on predefined processing strategies, signals 30 for controlling the operation of a power distribution apparatus (not shown).

The digital relay 1 comprises a computerised interface 3, which exchanges information 4 with the control unit 2. The information 4 can be related to the control strategies that should be adopted or other data related to the status of the digital relay 1 or the power distribution system. The computerised interface 3 comprises at least a computerised module 5 providing HTTP services. The computerised module 5 is connected to a communication network (preferably an ethernet network), which is connected at least with a computer 7.

From what described above, it appears clear that the computerised module 5 can act as a Web server, while the computer 7 can act as a client machine. For reaching this aim, the computer 7 is advantageously provided with a Web browser, which can exchange information with the computerised module 5. Preferably, the computerised module 5 comprises some hardware, which can be, for example, a 32-bit microprocessor and computerised storage means (ROM and RAM memories) for storing information. Obviously, some predefined software is needed, in particular a real time operating system (RTOS). This predefined software comprises preferably TCP/IP and HTTP protocol resources and an ethernet communication interface.

The computerised module 5 is provided with first computerised means 10 for representing the appearance and the functionalities of a MMI, in a virtual format. First computerised means 10 may comprise, for example, a set of HTML files (preferably provided with JAVA applets), in which the structure (i.e. hardware buttons) and/or all the other features for programming an MMI are visually represented.

The computerised module 5, when interrogated by the Web browser comprised in the computer 7, can send to the user an HTML file, defining the MMI appearance. The user can act on this file (for example clicking the proper virtual buttons), so as tp provide the control unit 2 with the information 4. Moreover, the user can modify, according to the needs, the structure of the mentioned HTML file and download it to the computerised module, so as to add new functionalities to the MMI.

It should be noticed that the MMI, intended as interface for the user, of the digital relay, according to the present invention, is now constituted by the computerised module 5, the network 6 and the computer 7, as illustrated in FIG. 1 (block 100).

The advantages of this approach are remarkable. First, the MMI has a standard hardware structure and the definition/change of its functionalities can be performed acting on the HTML files, without requiring any kind of hardware re-design.

Figure 2:
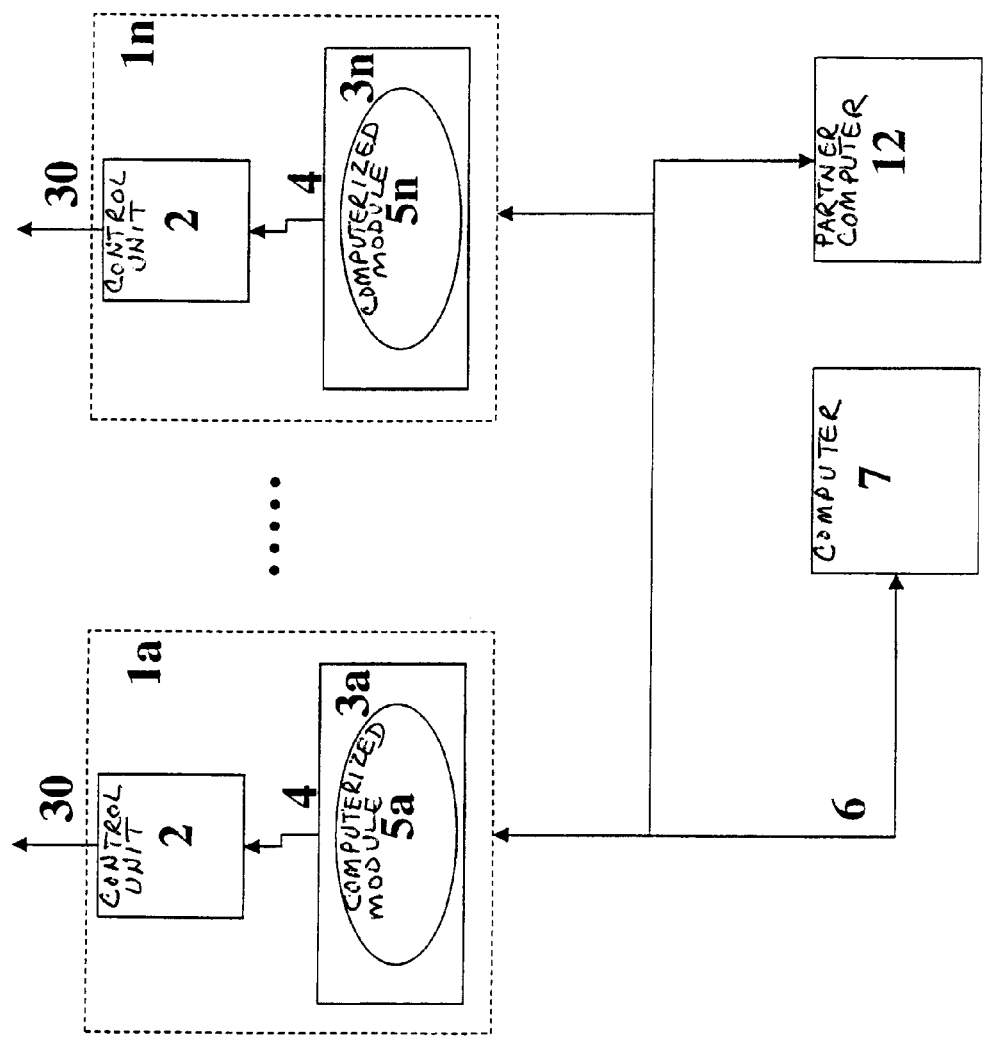
FIG. 2 represents an integrated protection system, which can be realised with the digital relay, according to the present invention.

The design of the MMI functionalities is extremely powered in terms of flexibility to the customer needs and reduction of required time and costs. Obviously, also maintenance and updating operations can be extremely effective with a consistent reduction of time and costs. The use of Internet communication technologies allows the digital relay 1 to execute new functionalities. In particular, the computerised module 5 can be equipped with a second computerised means 11, for exchanging remote information. Second computerised means 11 allows, for example, the exchange of e-mail messages in response of predefined status of the digital relay 1 or the remote retrieval of data. In this way, when a user connects to the computerised module 5, he can access to a remarkable amount of data, which was not available in traditional solutions. For example, diagnostic services and statistical analysis of the systems data (for example the statistical distribution of the interrupted currents) can be easily be provided, implementing, in the second computerised means 11, proper software programs. Some of the actions can be executed thanks to the hypertext links that are available on the HTML pages, memorised on the computerise module 5. For this aim, partner computers 12 can be connected to the network 6. As far the user is concerned, the information appears coming from the interrogated computerised module. Referring to FIG. 2, the digital relay according to the present invention allows building up, in an easy manner, an integrated protection system comprising, as represented schematically in FIG. 1, a plurality of digital relays $1a \ldots 1n$, for regulating the operation of a plurality of power distribution apparatuses (not shown). The relays $1a \ldots 1n$ comprise computerised modules $5a \ldots 5n$ that are connected by means of the common communication network 6, which is coupled at least to the computer 7. In practice, the computerised modules can be considered a plurality of Web servers connected to a client machine 7, which, accordingly to what described above, can be connected to a set of partner computers for information processing and gathering. In this manner, the user can open simultaneous multiple connections (inserting the proper URLs) to different computerised modules, included in $1a \ldots 1n$ digital relays. In practice, the user can manage multiple MMIs, at the same time. The capabilities of each computerised module are further increased and impressive (if compared with the traditional solutions) amounts of information can be made available to the user, without a significant effort in terms of costs. Finally, the digital relay 1, according to the present invention, as well as the integrated computerised system above described, has proven to be of easy realisation and at reduce costs, if compared with the traditional solution. The digital relay, according to the present invention, is susceptible of numerous modifications and variations, all of which are within the scope of the inventive concept. All the details may furthermore be replaced with other technically equivalent elements.

The invention claimed is:

1. A digital relay, for regulating operation of an apparatus, the digital relay comprising:
    a control unit for generating signals for controlling the operation of said apparatus; and
    a computerized interface for exchanging, with said control unit, information associated with a specific man-machine interface (MMI) hardware and related to control strategies to be adopted by said control unit for controlling the operation of said apparatus,
    wherein said computerized interface comprises a MMI computerized module including HTML files for representing a graphic user interface of functions for controlling the apparatus and said MMI computerized module being for providing Hyper Text Transfer Protocol (HTTP) services and acting as a web Server by transmitting HTML files to a computer connected to the computerized interface,
    wherein the graphic user interface is customizable by a user to modify the functions available for controlling the apparatus via the graphic user interface,
    wherein the customized information is transmitted from the computerized interface to the control unit to control the operation of the power distribution apparatus.

2. A digital relay according to claim 1, wherein the connected computer is connected to the computerized interface through an Ethernet communication network.

3. A digital relay according to claim 2, wherein said computer is connected, by means of said communication network, to one or more partner computers for at least one of processing and exchanging information.

4. A digital relay, according to claim 2, wherein said computer comprises a Web browser.

5. A digital relay according to claim 1, wherein said computerized module comprises:
    a microprocessor; and
    computerized storage means for storing at least one of data and information.

6. A digital relay according to claim 1, wherein said computerized module comprises an Ethernet communication interface.

7. A digital relay according to claim 1, wherein said computerized module comprises a TCP/IP protocol stack.

8. A digital relay according to claim 1, wherein said computerized module further comprises the first computerized means configured to represent, in a virtual format, the appearance and the functionalities of said man-machine interface related to said digital relay with a set of HTML files.

9. A digital relay according to claim 8, wherein said computerized module further comprises the second computerized means configured to perform a remote exchange of information between the digital relay, the computerized interface and the computer.

10. A digital relay, according to claim 1, wherein said computer comprises a Web browser.

11. The digital relay of claim 1, wherein the graphic user interface is customizable by a user to add a new function for controlling the apparatus on to the graphic user interface.

12. An integrated protection system for regulating the operation of a plurality of power distribution apparatuses, comprising a plurality of digital relays, each of the digital relays comprising:
    a control unit for generating signals for controlling the operation of said apparatus; and
    a computerized interface for exchanging, with said control unit, information associated with a specific man-machine interface (MMI) hardware and related to control strategies to be adopted by said control unit for controlling the operation of said apparatus,
    wherein said computerized interface comprises a MMI computerized module including HTML files for representing a graphic user interface of functions for controlling the apparatus and said MMI computerized module being for providing Hyper Text Transfer Protocol (HTTP) services and acting as a web Server by transmitting HTML files to a computer connected to the computerized interface,
    wherein the graphic user interface is customizable by a user to modify the functions available for controlling the apparatus via the graphic user interface,
    wherein the customized information is transmitted from the computerized interface to the control unit to control the operation of the power distribution apparatus.

13. An integrated protection system, according to claim 12, wherein the computerized modules of said plurality of digital relays, are connected by means of a common communication network to a common computer, comprising a Web browser.

14. A power distribution apparatus, such as at least one of a circuit breaker and a disconnector comprising a digital relay comprising:

a control unit for generating signals for controlling the operation of said apparatus; and a computerized interface for exchanging, with said control unit, information associated with a specific man-machine interface (MMI) hardware and related to control strategies to be adopted by said control unit for controlling the operation of said apparatus, wherein said computerized interface comprises a MMI computerized module including HTML files for representing a graphic user interface of functions for controlling the apparatus and said MMI computerized module being for providing Hyper Text Transfer Protocol (HTTP) services and acting as a web Server by transmitting HTML files to a computer connected to the computerized interface, wherein the graphic user interface is customizable by a user to modify the functions available for controlling the apparatus via the graphic user interface, wherein the customized information is transmitted from the computerized interface to the control unit to control the operation of the power distribution apparatus.

15. A power distribution network, comprising one or more digital relays, each of the digital relay comprising:

a control unit for generating signals for controlling the operation of said apparatus; and a computerized interface for exchanging, with said control unit, information associated with a specific man-machine interface (MMI) hardware and related to control strategies to be adopted by said control unit for controlling the operation of said apparatus, wherein said computerized interface comprises a MMI computerized module including HTML files for representing a graphic user interface of functions for controlling the apparatus and said MMI computerized module being for providing Hyper Text Transfer Protocol (HTTP) services and acting as a web Server by transmitting HTML files to a computer connected to the computerized interface, wherein the graphic user interface is customizable by a user to modify the functions available for controlling the apparatus via the graphic user interface, wherein the customized information is transmitted from the computerized interface to the control unit to control the operation of the power distribution apparatus.

16. A power distribution network comprising one or more integrated protection systems, each system comprising:

a control unit for generating signals for controlling the operation of said apparatus; and a computerized interface for exchanging, with said control unit, information associated with a specific man-machine interface (MMI) hardware and related to control strategies to be adopted by said control unit for controlling the operation of said apparatus, wherein said computerized interface comprises a MMI computerized module including HTML files for representing a graphic user interface of functions for controlling the apparatus and said MMI computerized module being for providing Hyper Text Transfer Protocol (HTTP) services and acting as a web Server by transmitting HTML files to a computer connected to the computerized interface, wherein the graphic user interface is customizable by a user to modify the functions available for controlling the apparatus via the graphic user interface, wherein the customized information is transmitted from the computerized interface to the control unit to control the operation of the power distribution apparatus.

17. A digital relay for regulating the operating of an apparatus, the digital relay comprising:

a control unit for generating signals for controlling the operation of said apparatus; and a computerized interface for exchanging, with said control unit, information associated with a specific man-machine interface (MMI) hardware and related to the control strategies to be adopted by said control unit for controlling the operation of said apparatus, wherein said computerized interface comprises an MMI computerized module including HTML files for representing a graphic user interface of functions for controlling the apparatus and said MMI computerized module being for providing HTML services and acting as a web server by transmitting the HTLM files to a computer connected to the computerized, wherein the customized information is transmitted from the computerized interface to the control unit to control the operation of the power distribution apparatus, wherein the graphic user interface represented by said HTML file, customizable by a user to modify the functions available for controlling the apparatus via the graphic user interface, wherein a plurality of partner computers are connected to the computer which comprises the web browser and wherein said computer includes a plurality of said HTML files related to a plurality of man-machine interfaces of a plurality of digital relays, and wherein hypertext links of said HTML files are usable by said plurality of said partner computer for at least one of processing information in said computerized module or for exchanging information with said computerized module and wherein a user is capable of simultaneously managing multiple man machine interfaces through said computer and said partner computers.

18. The digital relay of claim 17, wherein the graphic user interface is customizable by a user to add a new function for controlling the apparatus on to the graphic user interface.

* * * * *